UNITED STATES PATENT OFFICE.

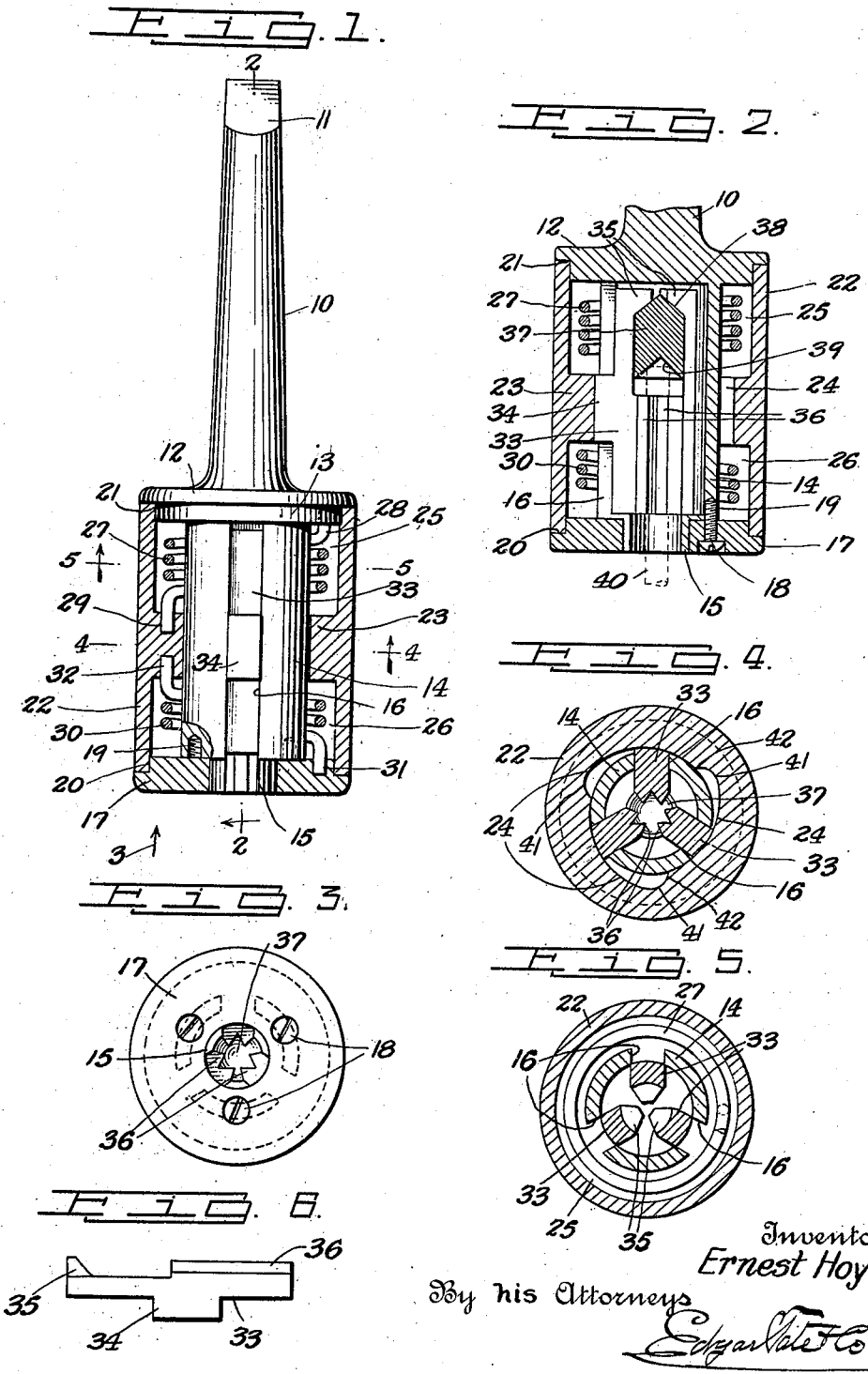

ERNEST HOYLE, OF BROOKLYN, NEW YORK.

CHUCK.

1,377,351.  Specification of Letters Patent.  Patented May 10, 1921.

Application filed February 11, 1920. Serial No. 357,962.

*To all whom it may concern:*

Be it known that I, ERNEST HOYLE, a citizen of the United States, and residing at Brooklyn, in the county of Kings and State of New York, have invented certain new and useful Improvements in Chucks, of which the following is a specification, such as will enable those skilled in the art to which it appertains to make and use the same.

This invention relates to chuck devices and particularly to what are known as spring chucks, and the object of the invention is to provide a chuck device of the class specified which is so constructed and operated as to firmly grasp a drill or other tool therein and to facilitate the exchange of drills or tools while the machine with which the chuck device is connected is in motion; a further object being to provide a chuck device of the class described with a plurality of tool gripping jaws with improved means for actuating said jaws to firmly grasp a tool inserted into the chuck; and with these and other objects in view the invention consists in a device of the class and for the purpose specified which is simple in construction and operation and efficient in use, and constructed and operated as hereinafter described and claimed.

The invention is fully disclosed in the following specification, of which the accompanying drawing forms a part, in which the separate parts of my improvement are designated by suitable reference characters in each of the views, and in which:—

Figure 1 is a side and sectional view of my improved chuck device;

Fig. 2 a partial section on the line 2—2 of Fig. 1;

Fig. 3 a view looking in the direction of the arrow 3 of Fig. 1;

Fig. 4 a transverse section on the line 4—4 of Fig. 1;

Fig. 5 a transverse section on the line 5—5 of Fig. 1 with part of the construction omitted; and, Fig. 6 a detail side view of one of a number of jaws which I employ.

In the accompanying drawing 10 represents the shank of the chuck device which is tapered in the usual manner, and one end portion of which is flattened as shown at 11 and the other end portion thereof is provided with an enlarged cylindrical head 12 outwardly of which is a reduced portion 13 provided centrally with a tubular extension 14 at the free end of which is a reduced sleeve extension 15. The tubular extension 14, in the form of construction shown, is provided with three longitudinally arranged and spaced apertures 16, which open inwardly and outwardly through said tubular extension and also through the free end of the extension 15, as clearly shown in Figs. 4 and 5. Mounted on the sleeve extension 15 is a disk 17 which is secured to the tubular extension 14 by a plurality of screws 18, the heads of which are preferably countersunk in the disk 17, and which pass into threaded apertures 19 in the outer face of the tubular extension 14. The inner face of the disk 17 is provided with an annular groove 20 which corresponds to a similar groove 21 formed in the enlarged head 12 by the reduced portion 13 thereof.

A sleeve member 22 is rotatably mounted on the tubular extension 14 and operates in and between the grooves 20 and 21 of the disk 17 and head 12 respectively and is provided approximately centrally of the inner face thereof with a projection 23 which is cut out or fashioned to form a plurality of cam faces 24, three of which are shown in the accompanying drawing. The projection 23 divides the sleeve member 22, or the bore thereof, into two separate chambers 25 and 26. Mounted within the chamber 25 is a spiral spring 27, one end of which is secured to the reduced portion 13 of the head 12 as shown at 28 and the other end of which is secured to the projection 23 as shown at 29. Another spiral spring 30 is mounted within the chamber 26 and one end of this spring is secured to the disk 17 as shown at 31, and the other end thereof to the projection 23 as shown at 32.

I also employ, in the form of construction shown, three jaw members 33, one of which is shown in detail in Fig. 6, and these jaw members are movably mounted in the apertures 16 of the tubular extension 14. Each of the jaw members are provided centrally of the outer faces thereof with projecting shoe portions 34, which are curved to conform with the curvature of the cam faces 24, or approximately so, and these shoe portions project through the apertures 16 and operate in connection with said cam faces, as clearly shown in Fig. 4. The inner ends of the jaw members are provided with inwardly directed beveled portions 35, and said jaw members are provided at the outer ends and on the inner faces thereof with longitudinal teeth 36, which operate in connection with a drill or other tool to firmly grasp the same. It will be understood, however, that I am not necessarily limited to any specific form of gripping face on the jaw members 33.

A plug 37 is also employed in connection with the chuck and is mounted between the separate jaw members 33 and is provided with a downwardly directed conical portion 38, which operates in connection with inwardly directed beveled portions 35 of said jaw members, as clearly shown in Fig. 2, and this plug is also provided in its outer face with a conical or countersunk aperture 39 adapted to receive the inner end portion of a drill 40 or other tool indicated in dotted lines in Fig. 2.

In assembling the various parts of my improved chuck device the spring 27 is passed over the tubular extension 14 and connected with the reduced portion 13 of the head 12 as shown at 28, the sleeve member 22 is then passed over the tubular extension 14 and placed in the groove 21 of the head 12 and the other end of said spring is connected with the projection 23 as shown at 29. The sleeve member 22 is then rotated to place the spring 27 under the required tension, after which the jaw members 33 with the plug 37 therebetween are all passed into the tubular extension 14 and the apertures 16 thereof, which open outwardly through the sleeve extension 15. It will be apparent that the sleeve member 22 must be held in position against the tension of the spring 27 in accomplishing the above result, and after the jaw members and plug 37 have been placed in position the sleeve member 22 may be released. The spring 30 is now placed in the chamber 26 and one end thereof connected with the projection 23 as shown at 32, after which the disk 27 is placed in position and the other end of the spring 30 connected therewith as shown at 31. It will be understood that before the screws 18 are placed in position to secure the disk 17 to the tubular extension 14, said disk is rotated to place the spring 30 under the required tension and the action of said spring and the spring 27 will be such as to normally hold the parts in the position shown in the accompanying drawing, or with the cam faces 24 operating upon the shoe portions 34 of the jaw members 33 to normally force said jaw members inwardly.

When it is desired to insert a drill or other tool in the chuck, the sleeve member 22 is grasped by the hand of the operator and rotated against the tension of the springs 27 and 30 to bring the separate jaw members 33 into line with the pockets 41 in the cam faces 24, which will permit of the outward movement of said jaw members upon the insertion of a drill or other tool, and by releasing the sleeve member 22 the springs 27 and 30 will return said sleeve member to its normal position and the drill or other tool will be grasped by the jaw members 33.

When the chuck device is connected with a suitable machine, and the machine is in operation, I may detach a drill or other tool from the chuck device and insert another drill or tool by grasping the sleeve member 22, while the chuck device is rotating and apply sufficient pressure to said sleeve member to act on the springs 27 and 30 to free the jaw members 30 from the cam faces 24 and bring the same into line with the pockets 41, as above set out, thus permitting of the removal of a drill or tool from the chuck and the insertion of another drill or tool without stopping the operation of the machine, or the rotation of the chuck device. When a drill is inserted into the chuck device while rotating, as above set out, and the drill brought into engagement with the workpiece, it will be seen that the inward pressure of the drill on the plug 37 will force said plug inwardly against the beveled projections 35 of the jaw members which operation will move the outer end portions of said jaw members inwardly to aid in the grasping of said drill. It is understood that the drill is normally grasped by said jaw members through the action of the cam faces 24 thereon. In other words, when the chuck is in operation the jaw members are firmly held in engagement with the drill supported in said chuck device by the action of the cam faces 24 upon said jaw members and by the inward pressure of the drill on the plug 37. It will also be apparent that the rotation of the chuck device is such as to constantly force the cam faces 24 in engagement with the shoe portions 34 of the jaw members and the springs 27 and 30 also operate to produce this result, thus in order to remove a drill supported in the chuck device, the rotary movement of the sleeve member 22 must be retarded by grasping the same and the retarding of this movement of the sleeve member acts against the tension of said spring, but it will be apparent that the shoulders 42 formed by the pockets 41 in the projection 23 limit the movement of the sleeve member 22 upon the jaw members 33 and the tubular extension 14.

It will be understood that while I have shown certain details of construction for carrying my invention into effect, I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. A chuck device of the class described comprising a shank having a tubular extension at one end thereof, a plurality of jaw members mounted in and movable radially of said extension, said shank being provided at the inner end of said tubular extension with an enlarged head, a disk secured to the outer end portion of said tubular extension, a rotatable sleeve member mounted on said tubular extension between said head and said disk, said sleeve member being provided with a plurality of cam faces adapted to operate in connection with said jaw members, tensional means operating in connection with said sleeve member for normally holding the jaw members in their innermost position by the action of the cam faces thereon, means whereby the rotation of said sleeve member against said tensional means will release the cam faces from said jaw members, and means operating in connection with said jaw members and in connection with which a tool inserted into the chuck device operates for aiding the gripping action of said jaw members.

2. A chuck device of the class described comprising a shank provided with an enlarged head portion and a tubular extension provided with a plurality of longitudinal apertures, jaw members mounted in said apertures and movable radially of said extension, said jaw members being provided with shoe portions, said tubular extension being provided with a sleeve extension, a disk mounted on said sleeve extension and secured to said tubular extension, a sleeve member rotatably mounted on said tubular extension between said disk and the enlarged head portion of the shank, said sleeve member being provided centrally of the inner face thereof with a projection having a plurality of cam faces adapted to operate in connection with the shoe portions of said jaw members, tensional means mounted within said sleeve member for normally holding the cam faces in engagement with said shoe portions of the jaw members, and a plug mounted within the tubular extension and operating in connection with the end portions of said jaw members.

3. In a chuck device of the class described, a plurality of jaw members loosely and detachably mounted in and adapted to move radially in said chuck device and provided at the inner ends thereof with beveled portions, a plug adapted to operate in connection with the beveled portions of said jaw members to move the outer end portions of said jaw members inwardly upon the inward movement of said plug within the chuck device by the action of a tool thereon.

4. In a chuck device of the class described, a plurality of jaw members loosely and detachably mounted in and adapted to move radially in said chuck device and provided at the inner ends thereof with beveled portions, means for moving said jaw members radially, a plug adapted to operate in connection with the beveled portions of said jaw members to move the outer end portions of said jaw members inwardly upon the inward movement of said plug within the chuck device by the action of a tool thereon.

5. In a chuck device of the class described, a plurality of jaw members loosely mounted in and adapted to move radially in said chuck device and provided on the inner ends thereof with beveled portions, tensionally operated means for moving said jaw members radially and inwardly to grasp a tool mounted in the chuck device, a plug adapted to operate in connection with said jaw member and provided with a conical face which operates in connection with the beveled portions of said jaw members, said plug being also provided with a countersunk aperture adapted to receive the inner end of the tool supported in the chuck device and said plug being adapted to move the outer end portions of said jaw members into firm engagement with the shank of the tool by the inward pressure of the tool on said plug.

In testimony that I claim the foregoing as my invention I have signed my name in presence of the subscribing witnesses this 31st day of January, 1920.

ERNEST HOYLE.

Witnesses:
C. E. MULREANY,
H. E. THOMPSON.